(12) United States Patent
Chao et al.

(10) Patent No.: US 10,384,591 B2
(45) Date of Patent: Aug. 20, 2019

(54) LOAD BINDER WITH ENCLOSED RATCHET MECHANISM AND REMOVABLE HANDLE

(71) Applicants: James Chuan Chao, Potomac, MD (US); Jianmin Liu, Potomac, MD (US)

(72) Inventors: James Chuan Chao, Potomac, MD (US); Jianmin Liu, Potomac, MD (US)

(73) Assignee: Jianmin Liu, Potomac, MD (US)

( * ) Notice: Subject to any disclaimer, the term of this patent is extended or adjusted under 35 U.S.C. 154(b) by 141 days.

(21) Appl. No.: 15/589,848

(22) Filed: May 8, 2017

(65) Prior Publication Data

US 2018/0319311 A1  Nov. 8, 2018

Related U.S. Application Data

(63) Continuation-in-part of application No. 29/603,257, filed on May 8, 2017, now Pat. No. Des. 831,455, and a continuation-in-part of application No. 29/603,282, filed on May 8, 2017, now Pat. No. Des. 830,801.

(51) Int. Cl.
*B60P 7/08* (2006.01)

(52) U.S. Cl.
CPC .................... *B60P 7/083* (2013.01)

(58) Field of Classification Search
CPC .............................. B60P 7/083; B60P 7/0853
See application file for complete search history.

(56) References Cited

U.S. PATENT DOCUMENTS

| 3,338,359 | A | * | 8/1967 | Baillie | B60P 7/083 |
| | | | | | 192/43.1 |
| 4,130,269 | A | * | 12/1978 | Schreyer | F16G 11/12 |
| | | | | | 24/19 |
| 7,451,962 | B1 | * | 11/2008 | Kennedy | F16B 7/06 |
| | | | | | 254/231 |
| 7,552,913 | B1 | * | 6/2009 | Amoss | F16G 11/12 |
| | | | | | 254/233 |
| 2011/0000317 | A1 | * | 1/2011 | Ruan | B60P 7/083 |
| | | | | | 73/862.42 |
| 2014/0109361 | A1 | * | 4/2014 | Helline | B60P 7/083 |
| | | | | | 24/68 CD |
| 2014/0326935 | A1 | * | 11/2014 | Chao | B60P 7/083 |
| | | | | | 254/235 |

FOREIGN PATENT DOCUMENTS

CA  2760240  A1 *  6/2013  .............. B60P 7/083

* cited by examiner

*Primary Examiner* — Emmanuel M Marcelo (57) ABSTRACT

A load binder with an enclosed ratchet mechanism and a removable handle consists of an elongated tubular portion, a handle, a ratcheting mechanism, a first threaded shaft, and a second threaded shaft. The first threaded shaft and the second threaded shaft are rotatably engaged to a tubular body of the elongated tubular portion. However, the first threaded shaft and the second threaded shaft do not detach from the tubular body. The tension on a chain that is attached at the first threaded shaft and the second threaded shaft can be adjusted by rotating the tubular body. The ratcheting mechanism is used to control the tubular body about the first threaded shaft and the second threaded shaft. To be protected from dirt and the like, the ratcheting mechanism is enclosed. The handle, which is removable, is used to control the ratcheting mechanism.

13 Claims, 9 Drawing Sheets

LOAD BINDER WITH ENCLOSED RATCHET MECHANISM AND REMOVABLE HANDLE

FIELD OF THE INVENTION

The present invention relates generally to securing cargo for transport. More specifically, the present invention relates to an improved ratcheting load binder.

BACKGROUND OF THE INVENTION

Cargo is goods or merchandise that conveyed in a ship, airplane, or vehicle. Generally, chains and load binders are used to secure cargo prior to being transported. The present invention is related to load binders. More specifically, the present invention addresses drawbacks of existing ratchet load binders.

The ratchet load binder, also referred to as the ratchet binder, is a device that uses a ratcheting action to tension a chain and secure cargo. In doing so, the ratchet load binder utilizes a handle used to control a ratcheting mechanism and two tension hooks on each end. Even though existing ratchet load binders have a series of benefits, there are also certain drawbacks that need to be addressed.

A major issue with existing ratchet load binders is the exposed ratcheting mechanism. Thus, the ratcheting mechanism is in direct contact with dirt, water, and other external material that can harm the overall functionality of the load binder. When exposed over an extended time, the gears and other moving components of the ratcheting mechanism can be damaged. Replacing these damaged components can be financially disadvantageous to the user. Moreover, cleaning dust or snow from the moving parts can be a time-consuming process which is disadvantageous in a commercial environment.

The protruding handle is another issue with existing load binders. The handle not only interferes with securing the chain but also makes the load binder more susceptible to theft. As an example, if a lock is not used, the handle can be used to loosen the tension of the load binder and access any cargo that was secured in place with the load binder. Therefore, a method that can minimize access to the load binder is required.

When securing large loads, the load binder needs to be tightened extensively. As a result, the attachment hooks and related components can be detached from the structural body of the load binder. Detaching of the attachment hooks can result in potential injury to the user. Moreover, detaching of the hooks can also be time consuming since the securing process needs to be repeated.

The objective of the present invention is to address the aforementioned issues. In particular, the present invention introduces a load binder with a ratcheting mechanism which is shielded from the atmosphere. Moreover, the present invention has a removable handle so that theft and other unfavorable circumstances are prevented. Since the attachment hooks are designed to be locked within a body of the load binder, the present invention also reduces the risk of injury.

DETAIL DESCRIPTIONS OF THE INVENTION

All illustrations of the drawings are for the purpose of describing selected versions of the present invention and are not intended to limit the scope of the present invention.

The present invention introduces a ratcheting load binder with an enclosed ratcheting mechanism and a removable handle. By utilizing the present invention, drawbacks related to malfunctioning of the ratcheting mechanism can be avoided. Moreover, convenience and safety is maximized with the introduction of the removable handle.

As seen in FIGS. 1-4, the present invention comprises an elongated tubular portion 1, a handle 11, a ratcheting mechanism 14, a first threaded shaft 20, and a second threaded shaft 21. The elongated tubular portion 1, which is the main structural body, can vary in size and shape in different embodiments of the present invention. The handle 11, which is designed to be removable, is used to control the ratcheting mechanism 14. The size and shape of the handle 11 can also vary from one embodiment to another. As an example, if the user requires significant leverage when controlling the ratcheting mechanism 14, a longer handle 11 can be used. The first threaded shaft 20 and the second threaded shaft 21 are used to attach the present invention to a chain that is used to secure cargo. More specifically, when the ratcheting mechanism 14 is controlled with the handle 11, the first threaded shaft 20 and the second threaded shaft 21 adjusts the tension on the chain that is used with the present invention to secure cargo. To prevent damage and boost longevity, the ratcheting mechanism 14 of the present invention is enclosed.

The elongated tubular portion 1 provides the structural base of the present invention and comprises a first end 2, a tubular body 3, and a second end 4. The tubular body 3 extends from the first end 2 to the second end 4 and determines the overall length of the elongated tubular portion 1. The tubular body 3 is preferably made of a sturdy material such as steel so that the tubular body 3 can withstand impacts caused by heavy loads used with the present invention. To adjust the tension of a chain attached to the present invention, the first threaded shaft 20 is concentrically and terminally engaged to the tubular body 3 at the first end 2. Similarly, the second threaded shaft 21 is concentrically and terminally engaged to the tubular body 3 at the second end 4. The ratcheting mechanism 14 which controls the position of the tubular body 3 relative to the first threaded shaft 20 and the second threaded shaft 21 is rotatably mounted onto the tubular body 3. In the preferred embodiment of the present invention, the ratcheting mechanism 14 is centrally mounted onto the tubular body 3, equidistant from the first end 2 and the second end 3. To accommodate to the shape of the tubular body 3 and be positioned at a preferred position along a perimeter of the tubular body 3, the ratcheting mechanism 14 encircles the tubular body 3. As mentioned before, the ratcheting mechanism 14 is controlled with the handle 11 which is removably attached to the ratcheting mechanism 14. Overall, by using the handle 11, the ratcheting mechanism 14 can be controlled. Thereby, the elongated tubular portion 1 can be controlled to adjust the tension at the first threaded shaft 20 and the second threaded shaft 21.

Figure 5:
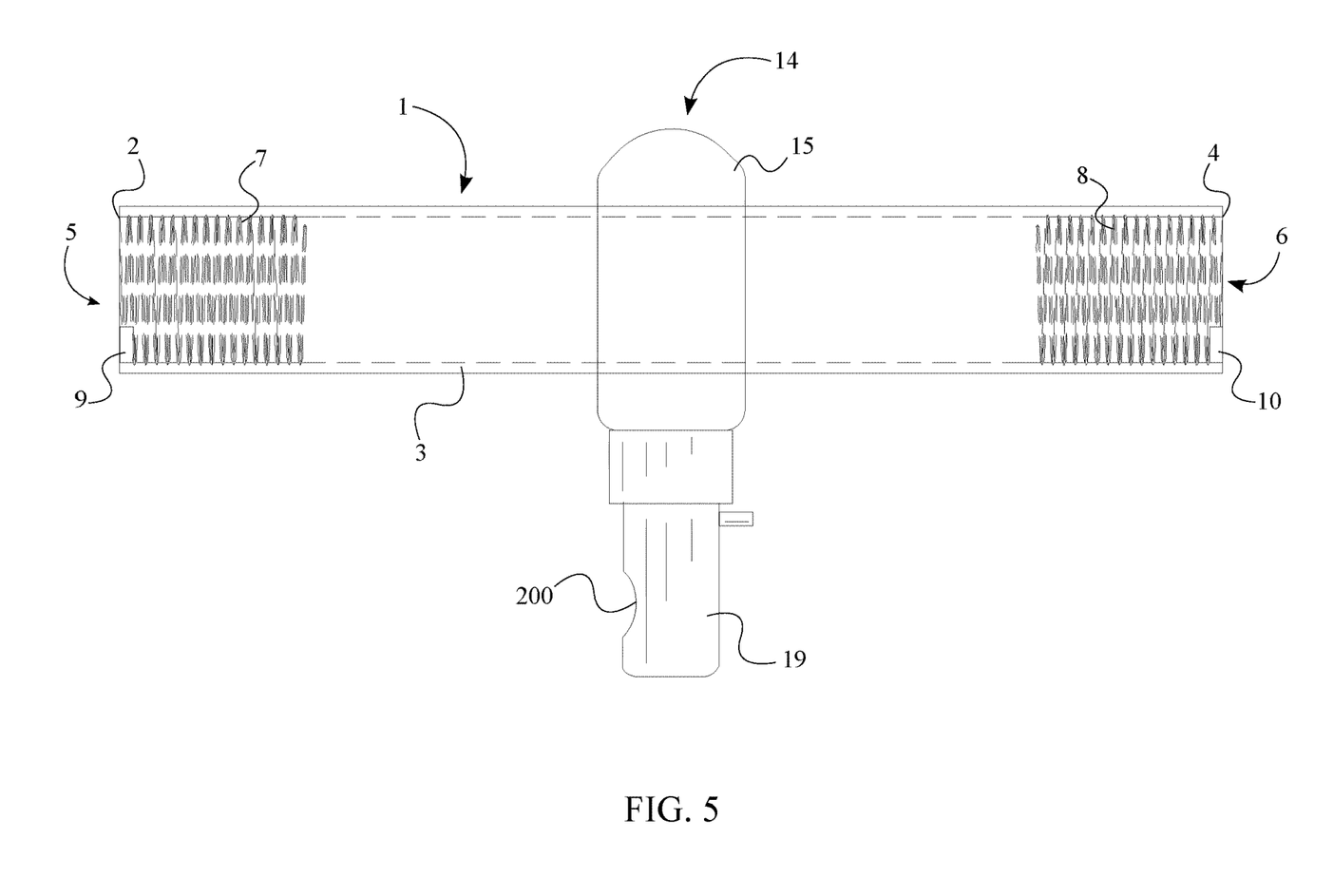
FIG. 5 is a front view of the tubular portion and the ratcheting mechanism, wherein the first set of internal threads and the second set of internal threads are illustrated.

As seen in FIG. 5, for the first threaded shaft 20 and the second threaded shaft 21 to be attached to the tubular body 3, the elongated tubular portion 1 further comprises a first opening 5, a second opening 6, a first set of internal threads 7, and a second set of internal threads 8. The first opening 5 concentrically traverses into the tubular body 3 at the first end 2 and is sufficiently sized to receive the first threaded shaft 20. Likewise, the second opening 6 concentrically traverses into the tubular body 3 at the second end 4 and is sufficiently sized to receive the second threaded shaft 21. To engage with the first threaded shaft 20, the first set of internal threads 7 traverses into the tubular body 3 from the first opening 5 adjacent to the first end 2. Similarly, to engage with the second threaded shaft 21, the second set of internal threads 8 traverses into the tubular body 3 from the second opening 6 adjacent to the second end 4. The purpose of the present invention is to apply tension to chains or straps securing cargo to the bed of a cargo truck or similar applications; thus, in order to accomplish this, the first threaded shaft 20 and the second threaded shaft 21 must move axially in opposing directions. For the first threaded shaft 20 and the second threaded shaft 21 to extend from or retract into the tubular body 3 in opposing directions, and thereby increase the tension or reduce the tension on the attached chain, the first set of internal threads 7 spiral in a first helical direction. On the other hand, the second set of internal threads 8 spiral in a second helical direction which is opposite to the first helical direction. In other words, the first set of internal threads 7 and the second set of internal threads 8 have opposing handedness. The first helical direction and the second helical direction ensure that the first threaded shaft 20 and the second threaded shaft 21 move in opposite directions simultaneously.

Figure 1:
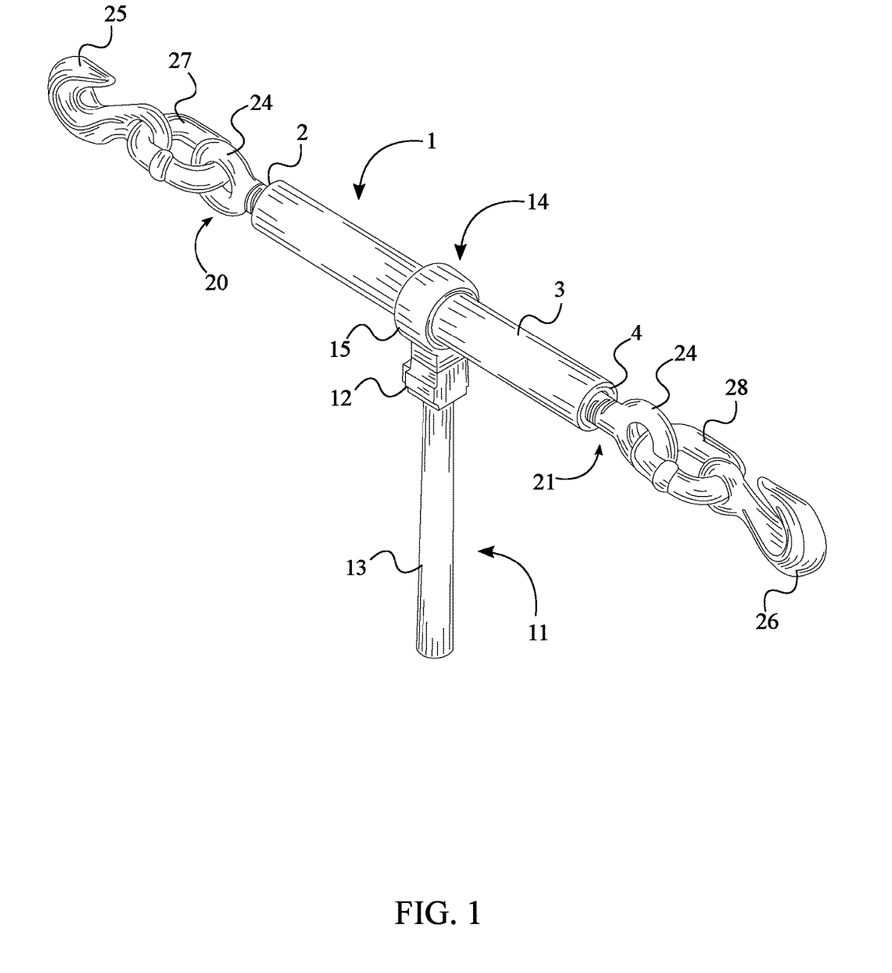
FIG. 1 is a perspective view of the present invention.
Figure 2:
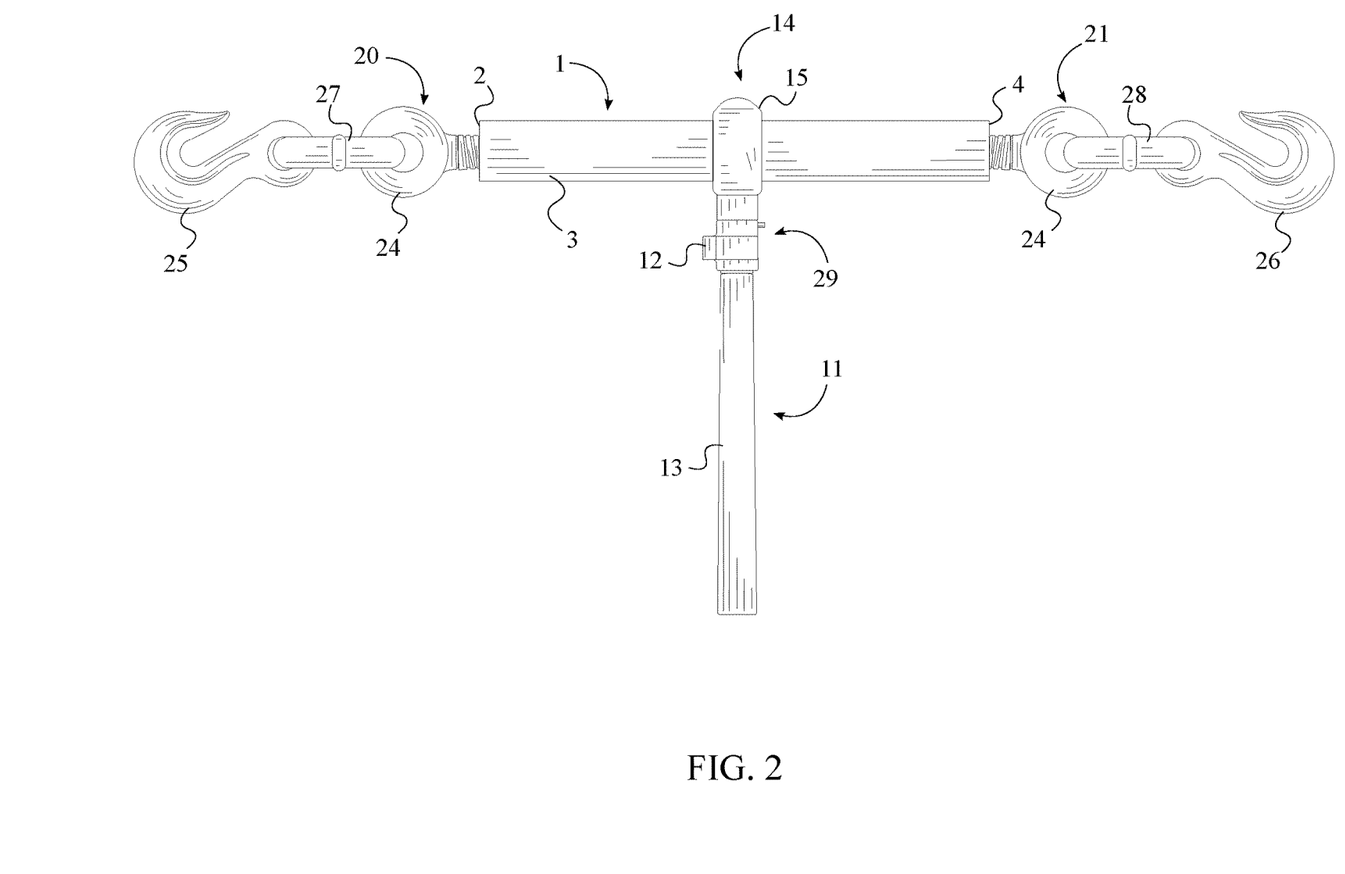
FIG. 2 is a front view of the present invention.
Figure 3:
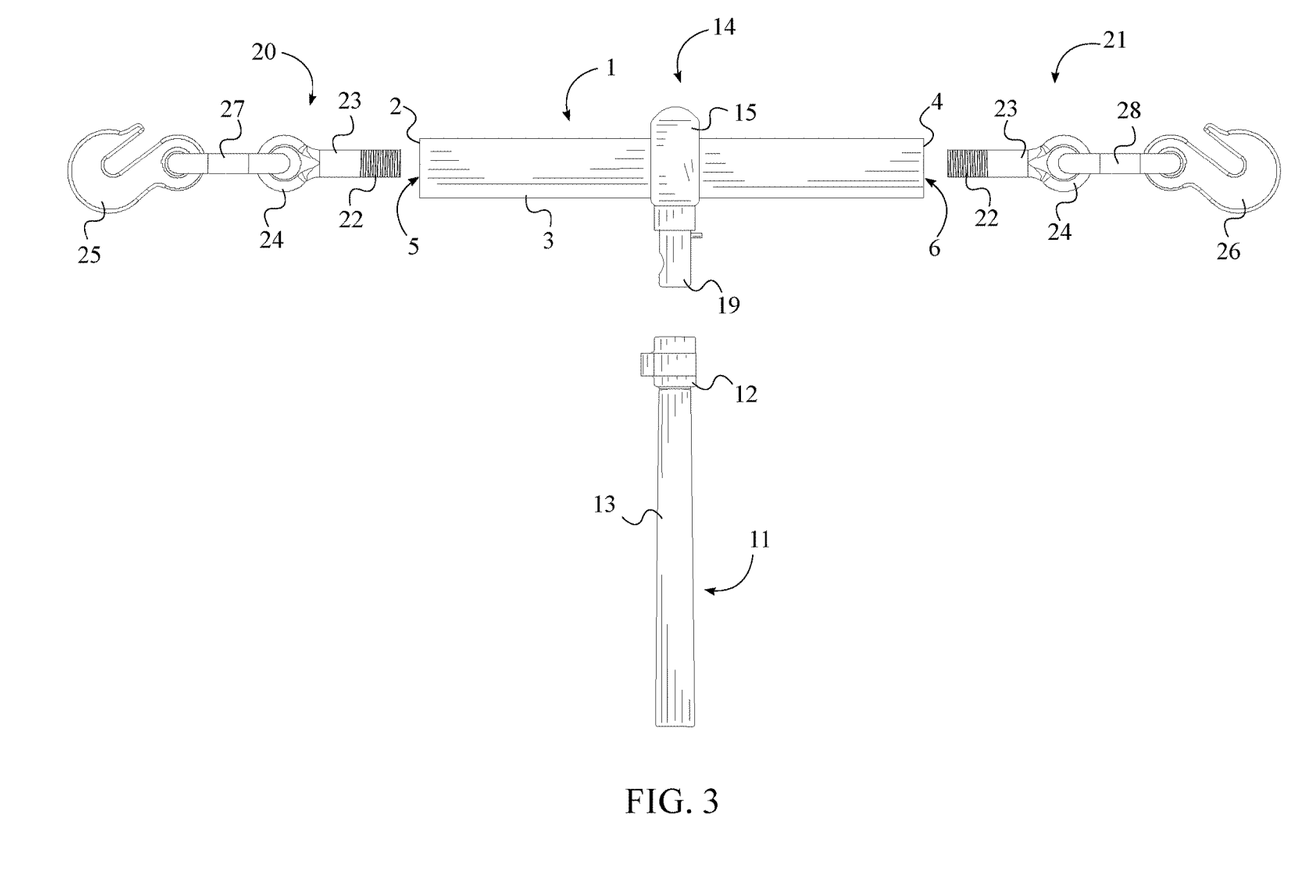
FIG. 3 is an exploded front view of the present invention.
Figure 4:
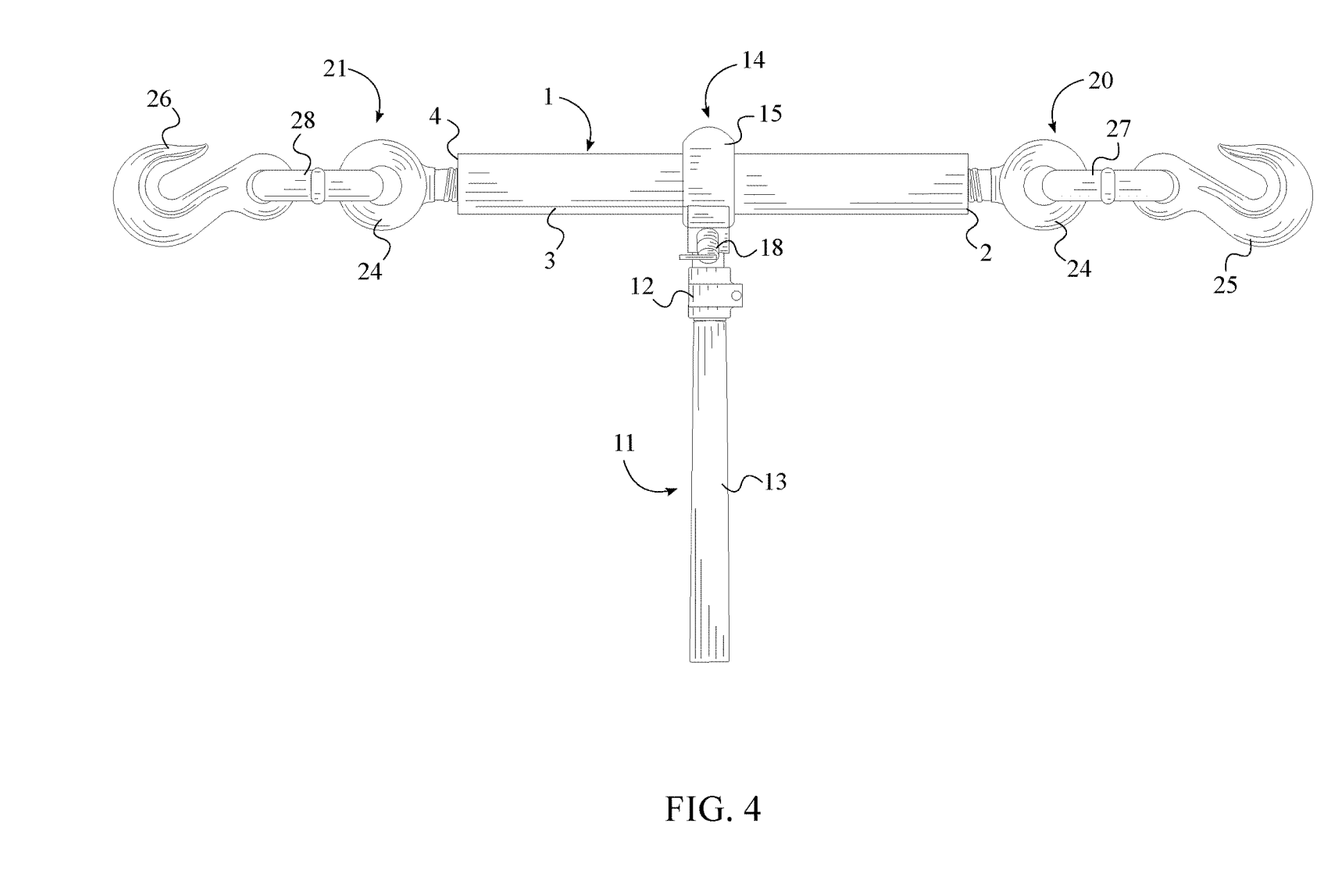
FIG. 4 is a rear view of the present invention.

The first threaded shaft 20 and the second threaded shaft 21 need to be designed to correspond with the tubular body 3. As seen in FIG. 3, the first threaded shaft 20 and the second threaded shaft 21 each comprise an externally threaded portion 22, a shaft body 23, and an attaching end 24. The externally threaded portion 22 of the first threaded shaft 20 is used to establish a connection with the first set of internal threads 7. In doing so, the externally threaded portion 22 of the first threaded shaft 20 is rotatably engaged with the first set of internal threads 7. The externally threaded portion 22 of the second threaded shaft 21 is used to establish a connection with the second set of internal threads 8. In doing so, the externally threaded portion 22 of the second threaded shaft 21 is rotatably engaged with the second set of internal threads 8. The shaft body 23, which extends from the externally threaded portion 22 to the attaching end 24, can vary in size and shape in different embodiments of the present invention. The attaching end 24 of both the first threaded shaft 20 and the second threaded shaft 21 is used to establish a connection with the chain that is used to secure cargo.

In existing ratchet load binders, when the tension exceeds a threshold point, the attachment hooks tend to detach from a main body. Such detachments can lead to potential injury. To prevent such circumstances, the elongated tubular portion 1 further comprises a first stop 9 and a second stop 10 as shown in FIG. 5. The first stop 9 is integrated into the first set of internal threads 7 at the first end 2. Therefore, when the first threaded shaft 20 extends outwards from the first end 2, the externally threaded portion 22 of the first threaded shaft 20 does not unthread beyond the first stop 9. Similar to the first stop 9, the second stop 10 is integrated into the second set of internal threads 8 at the second end 4. Therefore, when the second threaded shaft 21 extends outwards from the second end 4, the externally threaded portion 22 of the second threaded shaft 21 does not unthread beyond the second stop 10.

Figure 6:
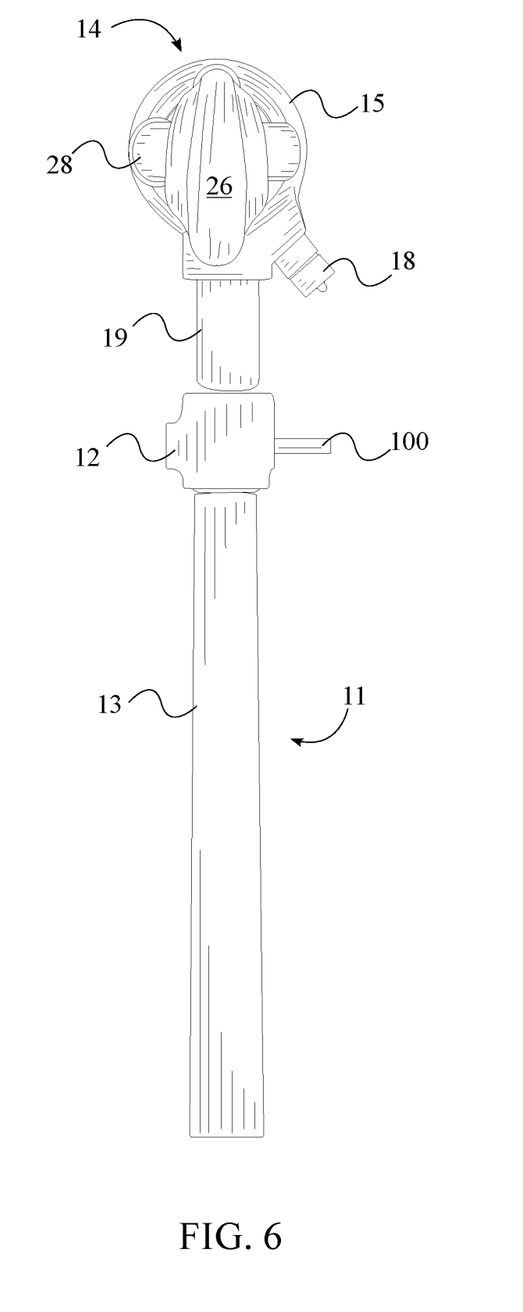
FIG. 6 is a side view of the present invention.
Figure 7:
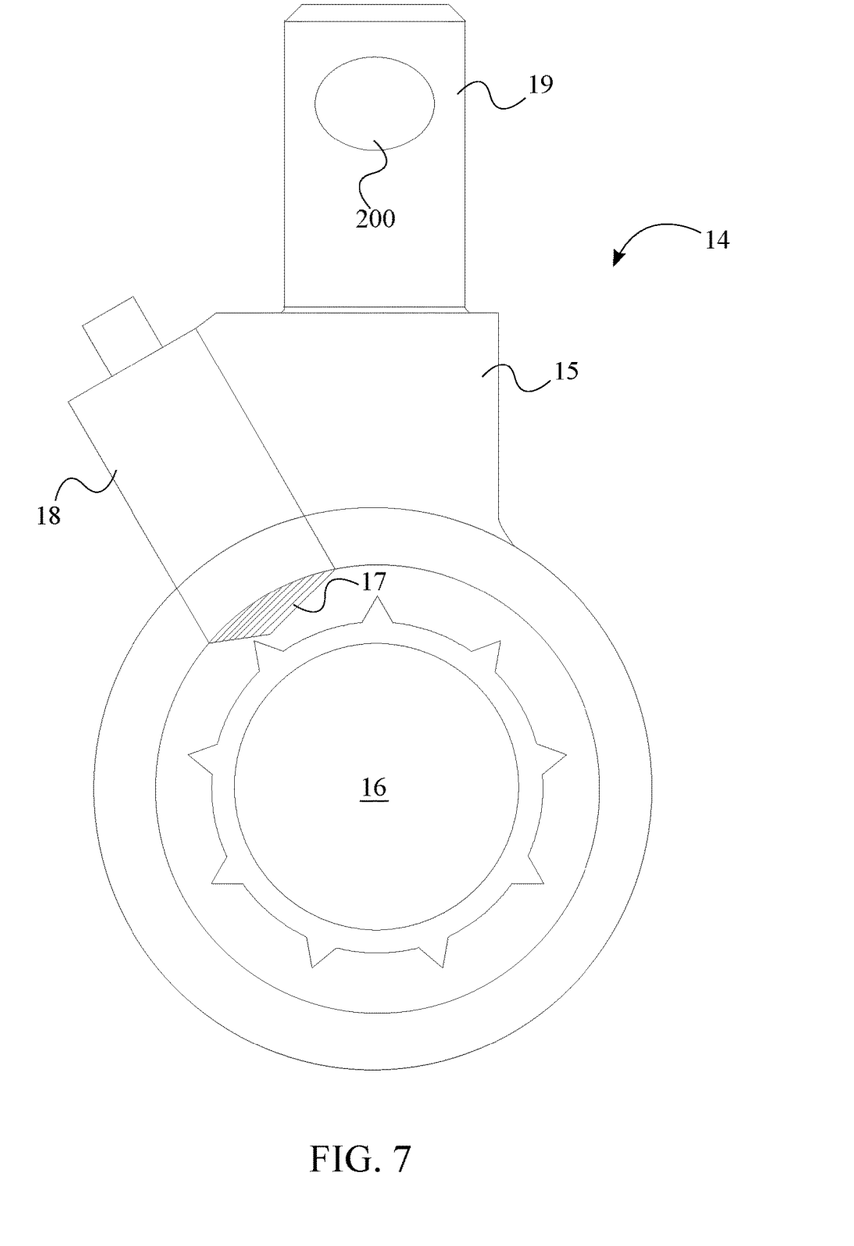
FIG. 7 is a cross-sectional view of the ratcheting mechanism.

The ratcheting mechanism 14 is used to control the position of the elongated tubular body 3 about the first threaded shaft 20 and the second threaded shaft 21. By doing so, the user can control the overall tension applied on the chain that is being used with the present invention. As discussed earlier, the ratcheting mechanism 14 of the present invention is designed with no exposure to the atmosphere. As illustrated in FIG. 7, the ratcheting mechanism 14 comprises an enclosed housing 15, a ratchet gear 16, a pawl 17, a pawl lever 18, and an attachment protrusion 19. The moving components of the ratcheting mechanism 14, which are the ratchet gear 16 and the pawl 17, are positioned within the enclosed housing 15. The pawl 17, which determines the direction in which the ratchet gear 16 rotates, is mechanically engaged to the ratchet gear 16. Therefore, when the direction of the ratchet gear 16 needs to be adjusted the user controls the pawl 17. Since the pawl 17 is positioned within the enclosed housing 15, the user needs an extension that can be used to control the pawl 17 externally. The pawl lever 18, which is axially connected to the pawl 17, functions as a means for engaging and disengaging the pawl 17 with the ratchet gear 16. In doing so, the pawl lever 18 extends outwards from the enclosed housing 15 as seen in FIG. 6. The pawl lever 18 extends outward via an opening of the enclosed housing 15 which is delineated by a rubber ring. Therefore, the ratchet gear 16 and the pawl 17 remain unexposed. When the pawl 17 is set to a preferred direction, the user proceeds to rotate the ratchet mechanism in the preferred direction at the attachment protrusion 19. When reversing the direction of rotation, the user pulls on the pawl lever 18, rotates the pawl lever 180-degrees to change the orientation of the pawl 17, and releases the pawl lever 18 so that the pawl re-engages the ratchet gear 16 in the opposite orientation. To be conveniently accessed and controlled, the attachment protrusion 19 is externally mounted onto the enclosed housing 15 as seen in FIG. 3 and FIG. 5.

The handle 11 is used along with the attachment protrusion 19 when rotating the ratcheting mechanism 14 in the preferred direction. To be used in conjunction with the attachment protrusion 19, the handle 11 comprises an engagement block 12 and a handle body 13 as seen in FIG. 1-4. The engagement block 12 is removably attached to the attachment protrusion 19 with an interlocking mechanism 29 so that the ratchet mechanism can be controlled by grasping the handle body 13. To do so, the engagement block 12 is terminally connected to the handle body 13 which can be of varying length.

Figure 8A:
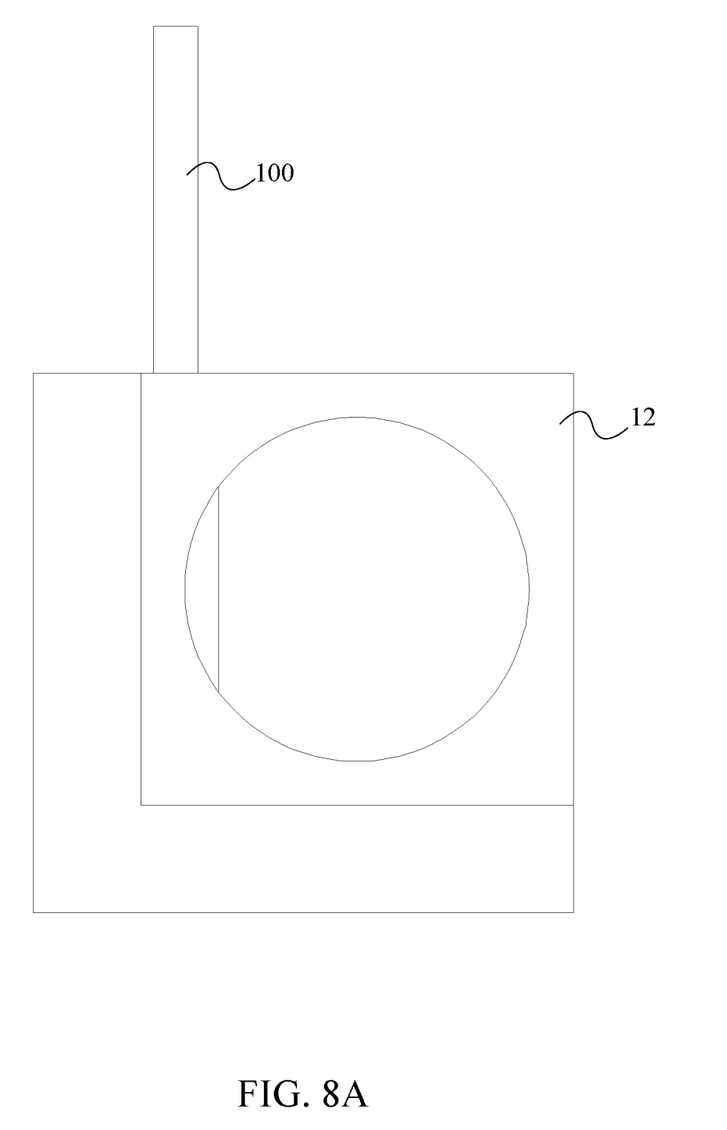
FIG. 8A is a front view of the engagement block, wherein a spring-loaded pin of the interlocking mechanism is in an expanded configuration.
Figure 8B:
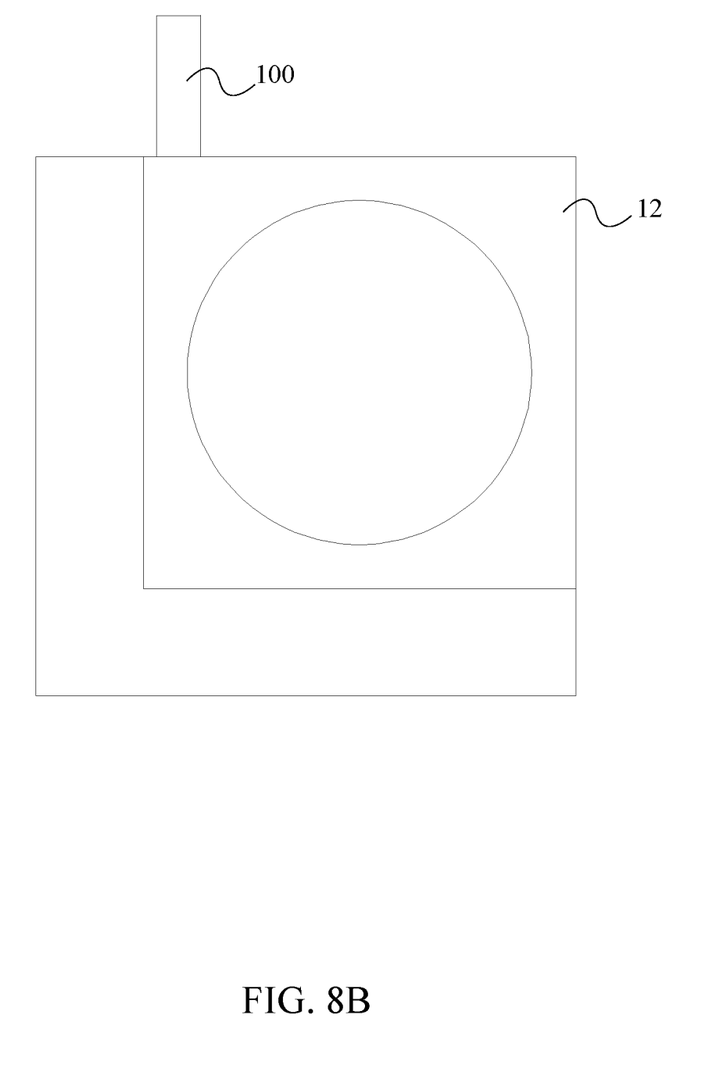
FIG. 8B is a front view of the engagement block, wherein a spring-loaded pin of the interlocking mechanism is in a compressed configuration.

The interlocking mechanism 29 can vary from one embodiment to another. In the preferred embodiment of the present invention, a spring-loaded pin 100 of the engagement block 12 is used along with a groove 200 of the attachment protrusion 19 as the interlocking mechanism 29. Initially, the spring-loaded pin 100 is aligned with the groove 200. Then, prior to attaching the handle 11, the spring-loaded pin 100 is compressed. The spring-loaded pin 100, which is compressed, allows the attachment protrusion 19 to be positioned within the engagement block 12. When appropriately positioned, the spring-loaded pin 100 is released so that the attachment protrusion 19 is interlocked with the engagement block 12. The connection between the spring-loaded pin 100 and the groove 200 ensures that the handle 11 is stationary about the attachment protrusion 19. The expanded configuration and the compressed configuration of the spring-loaded pin 100 are show in FIG. 8A and FIG. 8B respectively.

As mentioned earlier, the handle 11 is used to control the ratcheting mechanism 14 which thereby repositions the elongated tubular portion 1 about the first threaded shaft 20 and the second threaded shaft 21. By doing so, the tension on the chain used with the present invention is adjusted. The present invention comprises a first attachment member 25 and a second attachment member 26 which are used to attach the present invention to the chain. The first attachment member 25 is connected at the attaching end 24 of the first threaded shaft 20. Likewise, the second attachment member 26 is connected to the attaching end 24 of the second threaded shaft 21. The first attachment member 25 and the second attachment member 26 can vary in different embodiments of the present invention. In the preferred embodiment of the present invention both the first attachment member 25 and the second attachment member 26 are attachment hooks. In another embodiment of the present invention, each of the first attachment member 25 and the second attachment member 26 can be, but is not limited to, a U-shaped handle or an attachment ring.

For the first attachment member 25 and the second attachment member 26 to be independent of the first threaded shaft 20 and the second threaded shaft 21 respectively, the present invention further comprises a first intermediary chain link 27 and a second intermediary chain link 28. The first intermediary chain link 27 interconnects the attaching end 24 of the first threaded shaft 20 and the first attachment member 25. More specifically, the first attachment member 25 is connected to the attaching end 24 of the first threaded shaft 20 via the first intermediary chain link 27 as seen in FIGS. 1-4. On the other hand, the second intermediary chain link 28 interconnects the attaching end 24 of the second threaded shaft 21 and the second attachment member 26. More specifically, the second attachment member 26 is connected to the attaching end 24 of the second threaded shaft 21 via the second intermediary chain link 28.

When the present invention is being used, the following process flow is generally followed. Initially, the first attachment member 25 and the second attachment member 26 are hooked onto the chain the present invention is being used with. Next, the handle 11 is attached to the attachment protrusion 19 via the interlocking mechanism 29. When appropriately attached, the ratcheting mechanism 14 is controlled by grasping the handle body 13. When the chain is at the preferred tension, the handle 11 is removed and stored away.

Although the invention has been explained in relation to its preferred embodiment, it is to be understood that many other possible modifications and variations can be made without departing from the spirit and scope of the invention as hereinafter claimed.

What is claimed is:

1. A load binder with an enclosed ratchet mechanism and a removable handle comprises:
    an elongated tubular portion;
    a handle;
    a ratcheting mechanism;
    a first threaded shaft;
    a second threaded shaft;
    the elongated tubular portion comprises a first end, a tubular body, and a second end;
    the tubular body extending from the first end to the second end;
    the first threaded shaft being concentrically and terminally engaged to the tubular body at the first end;
    the second threaded shaft being concentrically and terminally engaged to the tubular body at the second end;
    the ratcheting mechanism being rotatably mounted onto the tubular body, wherein the ratchet mechanism encircles the tubular body;
    the handle being removably attached to the ratcheting mechanism, wherein the handle is used to rotate the elongated body by the ratcheting mechanism;
    the ratcheting mechanism comprises an enclosed housing, a ratchet gear, a pawl, a pawl lever, and an attachment protrusion;
    the ratchet gear and the pawl being positioned within the enclosed housing;
    the pawl being mechanically engaged with the ratchet gear;
    the pawl lever being axially connected to the pawl, wherein the pawl lever is used to engage and disengage the pawl with the ratchet gear;
    the pawl lever extending outwards from the enclosed housing through a rubber ring; and
    the attachment protrusion being externally mounted onto the enclosed housing.

2. The load binder with an enclosed ratchet mechanism and a removable handle as claimed in claim 1 further comprises:
    the elongated tubular portion further comprises a first opening, a second opening, a first set of internal threads, and a second set of internal threads;
    the first opening concentrically traversing into the tubular body at the first end;
    the second opening concentrically traversing into the tubular body at the second end;
    the first set of internal threads traversing into the tubular body from the first opening adjacent to the first end; and
    the second set of internal threads traversing into the tubular body from the second opening adjacent to the second end.

3. The load binder with an enclosed ratchet mechanism and a removable handle as claimed in claim 2 further comprises:
    the first set of internal threads spiraling in a first helical direction; and
    the second set of internal threads spiraling in a second helical direction, wherein the second helical direction is opposite of the first helical direction.

4. The load binder with an enclosed ratchet mechanism and a removable handle as claimed in claim 2 further comprises:
    the first threaded shaft and the second threaded shaft each comprise an externally threaded portion, a shaft body, and an attaching end;
    the shaft body extending from the externally threaded portion to the attaching end;
    the externally threaded portion of the first threaded shaft being rotatably engaged with the first set of internal threads; and
    the externally threaded portion of the second threaded shaft being rotatably engaged with the second set of internal threads.

5. The load binder with an enclosed ratchet mechanism and a removable handle as claimed in claim 2 further comprises:
the elongated tubular portion further comprises a first stop and a second stop;
the first stop being integrated into the first set of internal threads at the first end; and
the second stop being integrated into the second set of internal threads at the second end.

6. The load binder with an enclosed ratchet mechanism and a removable handle as claimed in claim 1 further comprises:
the handle comprises an engagement block and a handle body;
the engagement block being terminally connected to the handle body; and
the engagement block being removably attached to an attachment protrusion of the ratcheting mechanism.

7. The load binder with an enclosed ratchet mechanism and a removable handle as claimed in claim 6, wherein the engagement block is removably attached to the attachment protrusion with an interlocking mechanism.

8. The load binder with an enclosed ratchet mechanism and a removable handle as claimed in claim 1 further comprises:
a first attachment member;
a second attachment member;
the first attachment member being connected to the first threaded shaft at an attaching end of the first threaded shaft; and
the second attachment member being connected to the second threaded shaft at an attaching end of the second threaded shaft.

9. The load binder with an enclosed ratchet mechanism and a removable handle as claimed in claim 8 further comprises:
a first intermediary chain link;
a second intermediary chain link;
the first attachment member being connected to the attaching end via the first intermediary chain link; and
the second attachment member being connected to the attaching end via the second intermediary chain link.

10. The load binder with an enclosed ratchet mechanism and a removable handle as claimed in claim 8, wherein the first attachment member and the second attachment member are attachment hooks.

11. The load binder with an enclosed ratchet mechanism and a removable handle as claimed in claim 8, wherein the first attachment member and the second attachment member are U-shaped handles.

12. The load binder with an enclosed ratchet mechanism and a removable handle as claimed in claim 8, wherein the first attachment member and the second attachment member are attachment rings.

13. The load binder with an enclosed ratchet mechanism and a removable handle as claimed in claim 1, wherein the ratcheting mechanism is centrally mounted onto the body.

\* \* \* \* \*